United States Patent
Lai et al.

(10) Patent No.: US 11,898,022 B2
(45) Date of Patent: Feb. 13, 2024

(54) COATED AEROGELS

(71) Applicant: Viken Detection Corporation, Burlington, MA (US)

(72) Inventors: Hanh Lai, Arlington, MA (US); Brandon Chiou, Burlington, MA (US)

(73) Assignee: Viken Detection Corporation, Burlington, MA (US)

( * ) Notice: Subject to any disclaimer, the term of this patent is extended or adjusted under 35 U.S.C. 154(b) by 297 days.

(21) Appl. No.: 17/291,242

(22) PCT Filed: Nov. 8, 2019

(86) PCT No.: PCT/US2019/060572
§ 371 (c)(1),
(2) Date: May 4, 2021

(87) PCT Pub. No.: WO2020/097532
PCT Pub. Date: May 14, 2020

(65) Prior Publication Data
US 2021/0355293 A1 Nov. 18, 2021

Related U.S. Application Data

(60) Provisional application No. 62/757,727, filed on Nov. 8, 2018.

(51) Int. Cl.
*C08J 9/36* (2006.01)
*G01N 27/622* (2021.01)
*H01J 49/04* (2006.01)

(52) U.S. Cl.
CPC ............ *C08J 9/365* (2013.01); *G01N 27/622* (2013.01); *H01J 49/049* (2013.01);
(Continued)

(58) Field of Classification Search
CPC .......... H01J 49/00; H01J 49/02; H01J 49/049; C08J 9/365; C08J 9/08; C08J 2205/026;
(Continued)

(56) References Cited

U.S. PATENT DOCUMENTS 3,668,382 A * 6/1972 Cohen .................. G01N 27/622
250/288
6,740,416 B1 5/2004 Yokogawa et al.
(Continued)

FOREIGN PATENT DOCUMENTS

KR 20100036104 9/2008
WO 2007047970 4/2007

OTHER PUBLICATIONS

Chinese Search Report issued in Chinese Application No. 201980073293.7, entitled "Coated Aerogels" dated Aug. 11, 2022.
(Continued)

*Primary Examiner* — Jason L McCormack
(74) *Attorney, Agent, or Firm* — Sunstein LLP (57) ABSTRACT

Aerogel can be coated with a polymerizable resin, which cures to form a polymer-coated aerogel. The coated aerogels can be used structural or thermal insulating component, such as in analytical and scientific devices. Coated aerogels can be further coated with conductive material, a semi-conductive material, a non-conductive material, a resistive material, or a combination thereof.

12 Claims, 8 Drawing Sheets

(52) U.S. Cl.
CPC ...... *C08J 2205/026* (2013.01); *C08J 2379/08* (2013.01); *C08J 2463/00* (2013.01)

(58) Field of Classification Search
CPC . C08J 2379/08; C08J 2427/18; G01N 27/622; C08K 3/04; C08K 3/22; C08K 3/34; C08K 3/36; C08K 2201/013; C08K 2201/001; C08K 2201/005; C09D 127/18
USPC ........................................ 250/281, 282, 288
See application file for complete search history.

(56) References Cited

U.S. PATENT DOCUMENTS

| | | | | |
|---|---|---|---|---|
| 7,312,444 | B1* | 12/2007 | Willougbhy | ............ H01J 49/24 250/292 |
| 10,836,880 | B2 | 11/2020 | Yang et al. | |
| 2006/0269734 | A1 | 11/2006 | Krajewski et al. | |
| 2007/0029477 | A1* | 2/2007 | Miller | ................ G01N 30/7206 250/290 |
| 2009/0082479 | A1 | 3/2009 | Cho | |
| 2011/0068264 | A1* | 3/2011 | Xu | ....................... G01N 27/622 250/288 |
| 2014/0014747 | A1* | 1/2014 | Moeller | ................ H01J 49/165 239/690 |
| 2017/0016856 | A1 | 1/2017 | Zhang et al. | |
| 2017/0282096 | A1 | 10/2017 | Bouvier et al. | |
| 2018/0261400 | A1 | 9/2018 | Fischel | |

OTHER PUBLICATIONS

International Search Report and Written Opinion for International Application No. PCT/US2019/060572, "Coated Aerogels" dated Jul. 3, 2020.
International Preliminary Report on Patentability for International Application No. PCT/US2019/060572, "Coated Aerogels" dated May 11, 2021.
Chinese Patent Office, Supplemental Search Report dated May 12, 2023, Chinese Patent Application No. 2019800732937, pp. 1-2.
Second Office Action for Chinese Patent Application No. 201980073293.7, dated May 17, 2023, pp. 1-4.

* cited by examiner

COATED AEROGELS

RELATED APPLICATION

This application is the U.S. National Stage of International Application No. PCT/US2019/060572, filed Nov. 8, 2019, which designates the U.S., published in English, and claims the benefit of U.S. Provisional Application No. 62/757,727, filed on Nov. 8, 2018. The entire teachings of the above applications are incorporated herein by reference.

BACKGROUND

Analytical devices and scientific systems, such as chemical, biological, or electrochemical detectors and/or sensors, often have components or assemblies where weight, thermal management, or power consumption are constraints. Some devices and systems have components or environments that are thermally insulated. However, many insulative materials are fibrous or can generate dust, neither of which are desirable.

SUMMARY

Aerogel is an excellent material for use as a thermal isolator, and an aerogel can provide thermal insulation between adjacent components, assemblies, and environments. Structural components can also be formed of aerogels. Components made from aerogel materials are lightweight, thermally stable, and can self-insulate.

Described herein are polymer-coated aerogels. Coating an aerogel with a polymer can reduce flow of a fluid, such as gas or liquid, through the aerogel. Aerogels can be flaky or dusty, and coating an aerogel with a polymer can make the aerogel stronger, less flaky, and less dusty. In addition, fine particulate solid cannot easily pass through or soak into a coated aerogel. In some embodiments, a coating can reduce the surface porosity of the aerogel component relative to an uncoated aerogel.

Polymer-coated aerogels can be used in a variety of applications, such as in analytical or scientific devices, where such additional properties are desirable. As an example, an aerogel tube component can be coated with a non-porous coating that reduces fluid flow across the aerogel, thereby making the tube a container for a fluidic system. The polymer-coated aerogels can be used in scientific or analytical instruments to achieve thermal insulation, which can also have the effect of reducing power requirements necessary to maintain appropriate temperatures at specific locations within instruments. Coated aerogel materials can be optimized for low weight and high thermal insulation. In addition, coated aerogel materials can have adequate strength such that the materials can be used as structural components.

In some embodiments, a polymer-coated aerogel can be further coated with an electrically conductive coating, an electrically semi-conductive coating, an electrically non-conductive coating, or an electrically resistive coating. As an example, an aerogel component can be coated with an electrically conductive metal coating, which transforms a surface of the aerogel into a metal coated electrode. In another embodiment, coating an aerogel with an electrically resistive material forms a component that can function as a heater.

Described herein are polymer-coated aerogels. The polymer coating is on at least portion of a surface of the aerogel. In some instances, the polymer coating covers an entire surface of the aerogel.

The aerogel can be a polymer aerogel, a silica aerogel, a ceramic aerogel, a carbon aerogel, a metal oxide aerogel, or any combination thereof.

The polymer coating can be a fluoroplastic, a thermoset polycondensate, a thermoplastic, a thermoplastic polymer, a thermoplastic polycondensate, a thermoplastic elastomer, or any combination thereof. The polymer coating can be a polyimide or polytetrafluoroethylene (PTFE).

The aerogel can further include an electrically conductive coating on at least a portion of a surface of the polymer coating. The aerogel can further include an electrically resistive coating on at least a portion of a surface of the polymer coating. In some instances, the electrically conductive or electrically resistive coating covers an entire surface of the aerogel. In some instances, the electrically conductive or electrically resistive coating is deposited directly on the aerogel; in other words, the electrically conductive or electrically resistive coating does is not on a polymer-coated surface.

Described herein are methods of making a polymer-coated aerogel. The methods can include applying a polymer resin to an aerogel and allowing the polymer resin to polymerize.

The method can further include applying an electrically conductive coating on at least a portion of a surface of the aerogel or a surface of the polymer coating on the aerogel. The method can further include applying an electrically resistive coating on at least a portion of a surface of the aerogel or a surface of the polymer coating on the aerogel.

Described herein is an ion mobility spectrometer that includes a sample inlet or a thermal desorber, an ionization region, and a drift tube. The ion mobility spectrometer can further include an aerogel at least partially, or in some cases completely, between the sample inlet or thermal desorber and the ionization region. The ion mobility spectrometer can further include an aerogel at least partially, or in some cases completely, between the ionization region and the drift tube. The ion mobility spectrometer can further include an aerogel at least partially, or in some cases completely, surrounding the sample inlet or thermal desorber, the ionization region, and the drift tube. The ion mobility spectrometer can further include a chemical permeation chamber, which can be at least partially, or in some cases completely, surrounded by an aerogel. The ion mobility spectrometer can further include a dryer module, which can be at least partially, or in some cases completely, surrounded by an aerogel.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1A-B are schematics of coated aerogels. The coated aerogels of FIGS. 1A-B can be used as structural components. The aerogels can be coated with an electrically conductive or electrically resistive material to make it an electrically conductive element or electrically semi-conductive element, for example an electrode. FIG. 1A illustrates coating on one surface of a solid aerogel component. FIG. 1B illustrates coating on multiple surface of a solid aerogel component.

FIG. 2A illustrates coating on an interior surface of the aerogel. FIG. 2B illustrates coating on an exterior surface of the aerogel. FIG. 2C illustrates coating on interior and exterior surfaces of the aerogel.

FIG. 3A illustrates an embodiment in which a second coating covers all or substantially all of the surface of the aerogel. FIG. 3B illustrates an embodiment in which a second coating is patterned and partially covers a surface of the aerogel. In some embodiments, the patterned coating is formed of a resistive material, thereby forming an aerogel component with an integrated heating element. In some embodiments, the patterned coating is formed of a resistive or conductive material.

FIGS. 4A-B are schematics of an aerogel material as a thermal insulating component between adjacent environments or between adjacent components.

FIGS. 5A-B are photographs of a coated aerogel.

FIGS. 7A-C are photographs of a gas flow tube. FIG. 7A is a flow tube.

DETAILED DESCRIPTION

A description of example embodiments follows.
Aerogels

As used herein, "aerogels" are porous materials derived from a gel, in which the liquid component for the gel has been replaced with a gas. Typically, aerogels are solid and have low density and low thermal conductivity. Aerogels typically have a porous solid network that contains air pockets. Since aerogels are porous, fluids (gas and liquid) can typically flow through the material. Fine particulate matter may also be able to pass through an aerogel.

Aerogels can be formed of wide variety of materials. Examples include polymer aerogels, silica aerogels, ceramic aerogels, carbon aerogels, and metal oxide aerogels. Examples of polymer aerogel include polyimide aerogels and resorcinol-formaldehyde aerogels. Silica aerogels can be derived from a silica gel. Carbon aerogels typically are composed of nanometer-sized particles. Examples of metal oxide aerogels are aluminum oxide aerogels and iron oxide aerogels. In some instances, materials that are composed of an aerogel in combination with glass fibers, such as PYROGEL®, can be used.

Aerogels can be provided in a variety of form factors. In some instances, an aerogel can be a three-dimensional material (e.g., a block of material of at least 1 cm×1 cm×1 cm). In other instances, an aerogel can be a thin film (e.g., a film up to about 5 mil). In other instances, an aerogel can be a powder impregnated on a supporting structure. In other instances, an aerogel can be moldable, in that the aerogel can be formed into a preferred structural shape through the use of a mold. In some instances, the aerogel can be machinable (e.g., material can be removed or cut away to form a desired structure).

Polymer Coated Aerogels

Aerogel materials are porous in structure and contain mostly air. In order to use an aerogel to restrict the flow of gas, liquid, and fine solid particulates, the aerogel can be coated (or encapsulated) with a thin layer of solid polymer. These polymer-coated aerogels can overcome limitations associated with traditional aerogel products. Notably, polymer-coated aerogels substantially prohibit flow of fluid and fine particulates through the aerogel compared to uncoated aerogels. At the same time, polymer-coated aerogels provide low thermal conductivity and structural integrity comparable to uncoated aerogels.

A wide variety of polymers can be coated onto an aerogel surface. An aerogel surface can be coated with a fluoroplastic, a thermoset polycondensate, a thermoplastic, a thermoplastic polymer, a thermoplastic polycondensate, and a thermoplastic elastomers. For example, an aerogel can be coated with polytetrafluoroethylene (PTFE), fluorinated ethylene propylene (FEP), polychlorotrifluoroethylene (CTFE), ethylene chlorotrifluoroethylene (ECTFE), ethylene tetrafluoroethylene (ETFE), polyamides (e.g., NYLON, NYLON 6, and NYLON 6,6), thermoplastic polyurethanes (TPU), melamine formaldehyde, phenol-formaldehyde, ethylene vinyl alcohol, (E/VAL), acrylonitrile-butadiene-styrene (ABS), polyacetal, polyacrylates, polyacrylonitrile (PAN), polyamide-imide (PAI), polyaryletherketone (PAEK), polybutadiene (PBD), polybutylene (PB), polycarbonate (PC), polydicyclopentadiene (PDCPD), polyektone (PK) polyester, polyetheretherketone (PEEK), polyetherimide (PEI), polyethersulfone (PES), polyethylene (PE), low-density polyethylene (LDPE), high-density polyethylene (HDPE), polyethylenechlorinates (PEC), polyimide (PI), polymethylpentene (PMP), polyphenylene pxide (PPO), polyphenylene sulfide (PPS), polyphthalamide (PTA), polypropylene (PP), polystyrene (PS), polysulfone (PSU), polyurethane (PU), polyvinylchloride, (PVC), polyvinylidene chloride (PVDC), silicone (SI), and aramids (aromatic polyamides, such as para-aramids and meta-aramids; aramids are generally prepared by a reaction between an amine group and a carboxylic acid halide group). For some applications, the polymer-coated aerogel is used to insulate against high temperature environments. Consequently, preferred polymers have a sufficiently high melting point and are stable at the high temperatures of the nearby environment. Preferred polymers should also exhibit low outgassing, even upon exposure to high temperature environments. Preferably, the polymer coating is pliable and does not crack when flexed or bent.

Aerogels can be coated with a polymer by a wide variety of known methods. For example, aerogels can be coated by dip coating, spin coating, spray coating, brush coating, and vapor deposition (e.g., chemical vapor deposition and physical vapor deposition). Typically, the resin for polymerization soaks into at least a portion of the surface of the aerogel.

After coating the aerogel with a polymerizable resin, any solvent evaporates (dries) and the resin is allowed to cure (polymerize). In some instances, heat may be applied in order to increase the polymerization rate and reduce the amount of time required for curing. Once the polymer has cured (polymerized), the aerogel surface having a polymer coating is non-porous. The interior retains the aerogel structure.

In some embodiments, an aerogel surface can be coated by laminating a polymer film to a surface of the aerogel. Lamination requires adhering the film to the aerogel surface by using adhesive or heat. One drawback of lamination is that the film surface usually does not fully encapsulate all surfaces and edges, especially when the aerogel has a complex structure (e.g., structures other than a flat surface).

As illustrated in the figures, polymer-coated aerogels are formed of an aerogel 110 having a polymer coating 120. In some instances, only a single side of an aerogel 110 can be coated. In some instances, only a portion of a single side of an aerogel 110 can be coated. In some instance, an aerogel 110 can be completely encapsulated within a polymer coating.

Figure 1A:
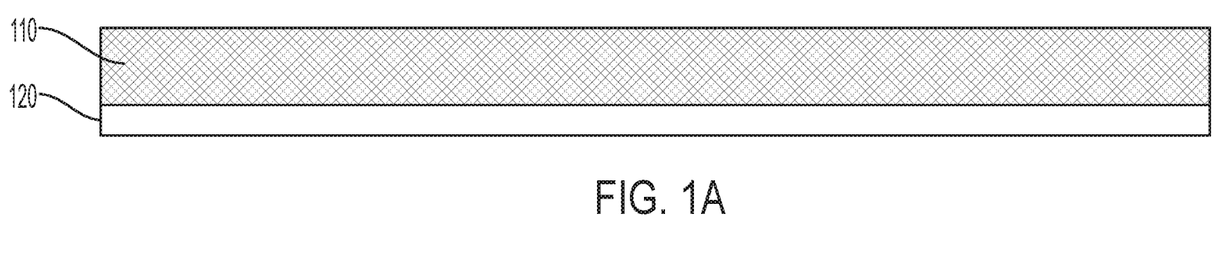
Figure 1B:
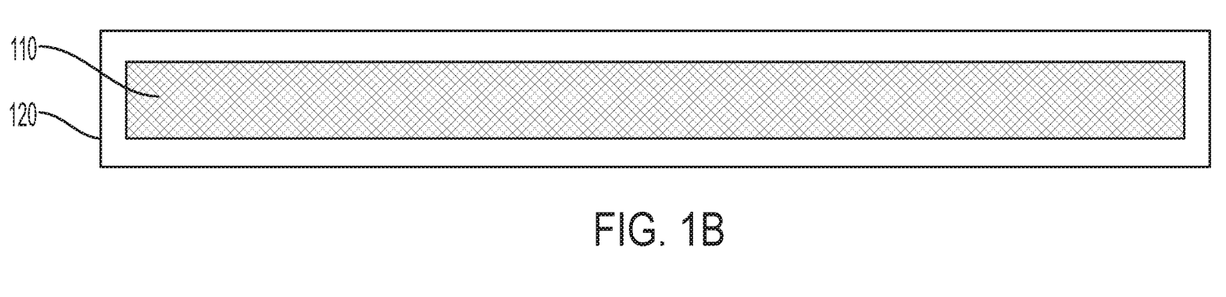

FIGS. 1A-B are schematics of example embodiments of coated aerogels. The coated aerogel of FIG. 1A can provide thermal insulation against a flat component. The coating is on the external side of the aerogel assembly, making it less dusty and containing any potential fragments that break off from the aerogel structure. One example is thermally insulating a flat heater element, where the non-coated surface is placed against the heater. The coated aerogel of FIG. 1B is coated on all sides, and can be used as a thermal break between components and in applications where dust from the aerogel structure should be contained. For example, the coated aerogel of FIG. 1B can be used to insulate between two components along a critical pathway, where generation of dust is particularly detrimental.

Figure 2A:
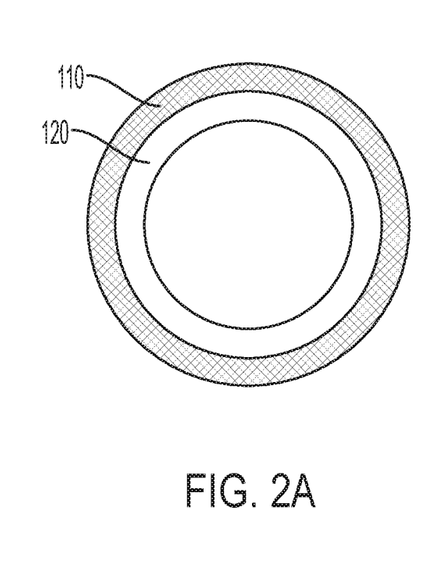
FIGS. 2A-C are schematics of coated, hollow aerogels, which illustrate coating on one or more surfaces. The coated, hollow aerogels can be used as structural components. The aerogels can be coated with an electrically conductive coating, an electrically semi-conductive coating, or an electrically non-conductive coating to make it a container for containing gas, fluid, or other materials, for example a gas flow tube or a material container.
Figure 2B:
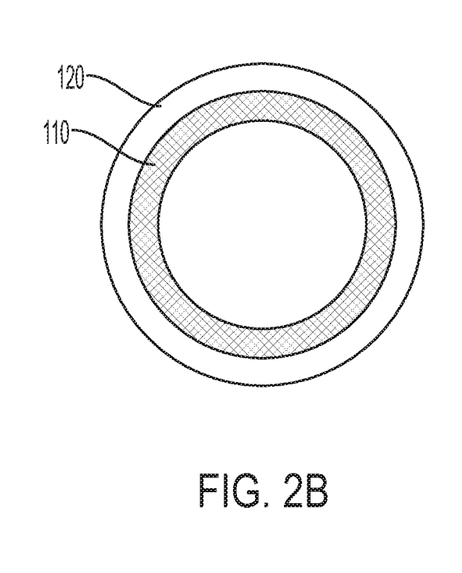
Figure 2C:
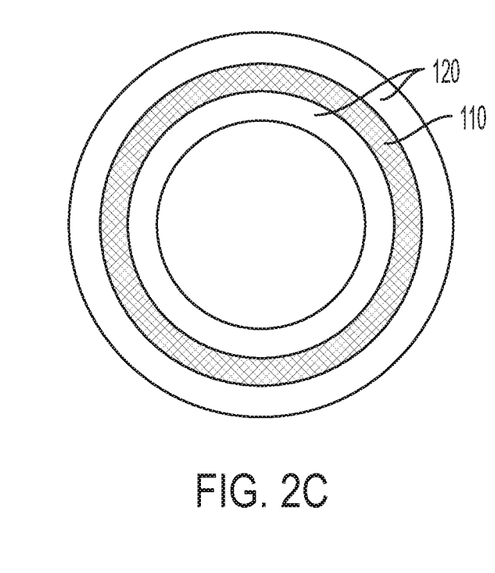

FIGS. 2A-C are schematics of example embodiments of coated, hollow aerogels. FIG. 2A illustrates an embodiment of a hollow tube formed of an aerogel, with a polymer coating on the inside. The interior polymer coating reduces fluid flow, thereby allowing fluid to predominantly flow through the tube rather than seep across the aerogel. FIG. 2B illustrates an embodiment of a hollow tube formed of an aerogel, with polymer coating on the exterior. FIGS. 2A and 2B are embodiments with coating on only one surface, and are better used as inserts in conjunction with another tubular structure, so that the non-coated surface is not exposed and the risk of damage to the aerogel is minimized. FIG. 2C illustrates an embodiment of a hollow tube formed of an aerogel, with polymer coating on the interior and exterior. The embodiment of FIG. 2C is particularly suitable for use as a stand-alone container for fluid flow.

Surfaces of an aerogel component that are adjacent to another solid surface may not need to be polymer-coated. Where the aerogel is adjacent to another surface, the aerogel is unlikely to be damaged, and thus polymer-coating that surface is unnecessary. A coated surface is generally preferred for surfaces that are adjacent to the environment.

Electrically Conductive and Electrically Resistive Coatings for Aerogels

In some embodiments, an aerogel surface that has been coated with a polymer can be further coated with an electrically conductive or electrically resistive coating. The electrically conductive or electrically resistive coating can be applied by metal screen printing, by conductive or resistive paste/ink printing, or by other techniques known in the art to make it into an electrical component. A non-porous surface is more desirable for printing on compared to porous surface because the electrically conductive or electrically resistive ink can be applied consistently to a controlled thickness to provide desired performance.

Figure 3A:
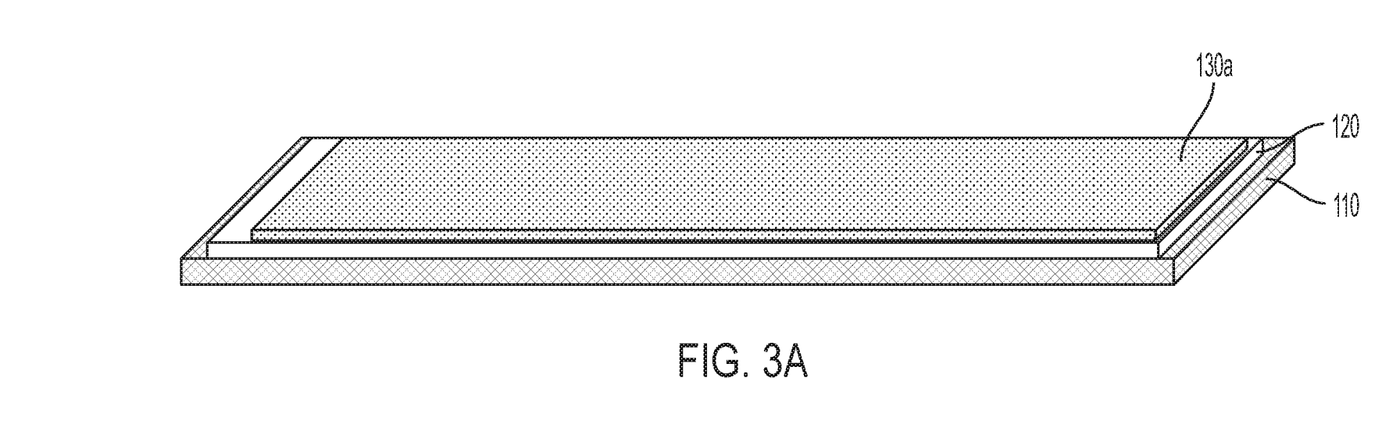
FIGS. 3A-B are schematics of an aerogel structural component having multiple coatings. Each coating can partially or completely cover a surface of the aerogel.
Figure 3B:
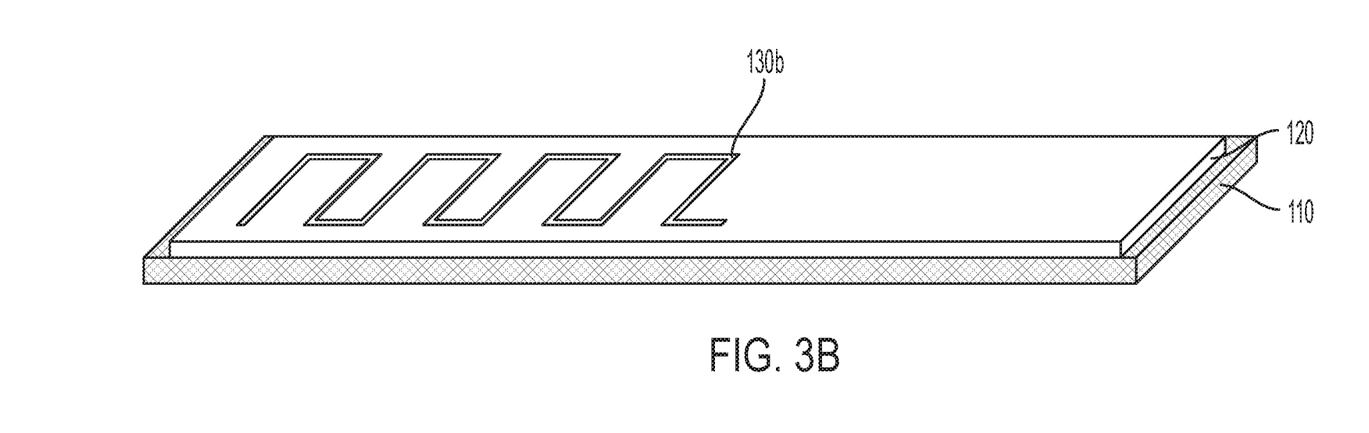
Figure 4A:
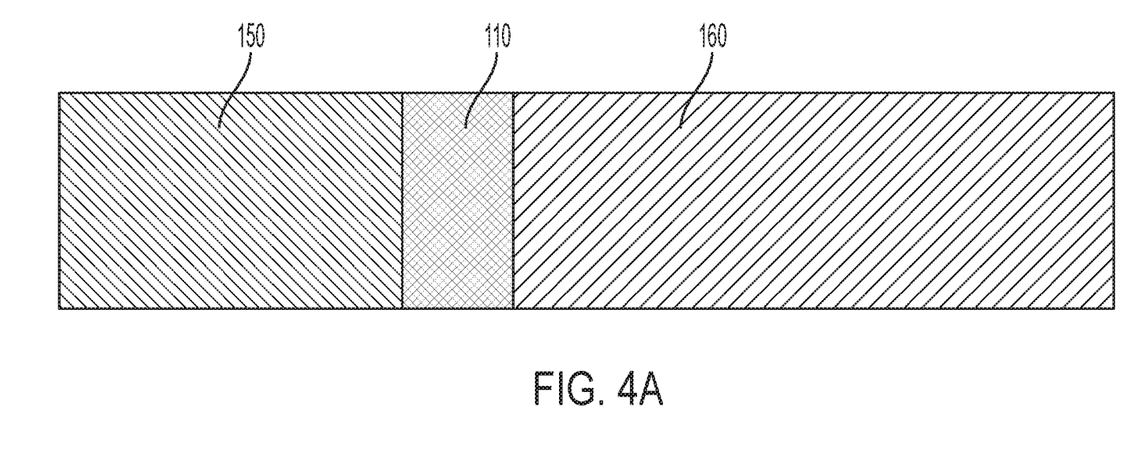
FIG. 4A illustrates an uncoated aerogel.
Figure 4B:
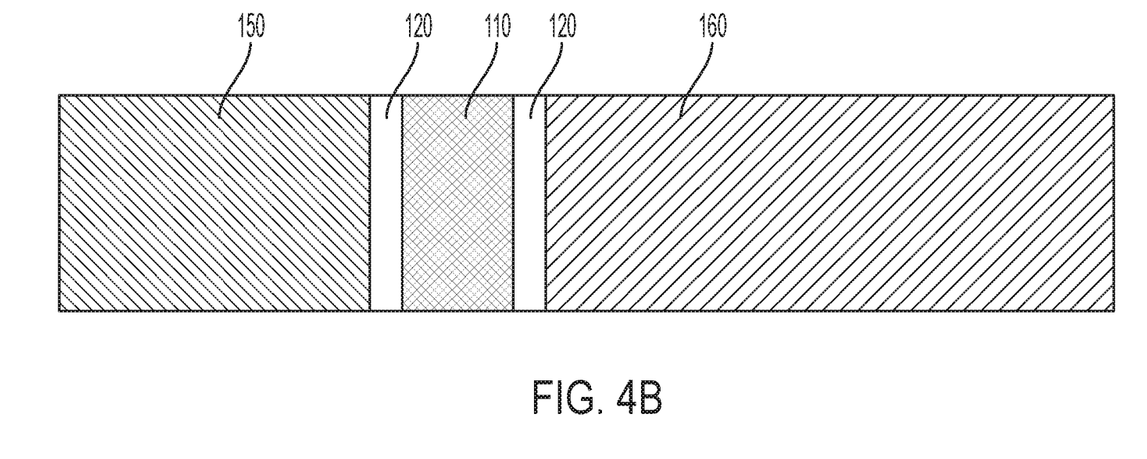
FIG. 4B illustrates a coated aerogel.

FIGS. 3A and 3B are schematics of an aerogel structural component having multiple coatings. In FIG. 3A, a second coating 130a is coated over a polymer coating 120 and covers all, or substantial all, of one or more surfaces of polymer coating 120, which in turn coat aerogel 110. In FIG. 3B, a second coating 130b is coated over a polymer coating 120. Coating 130b is patterned and partially covers a surface of polymer coating 120. In some embodiments, coatings 130a and 130b are formed of a resistive material. Applying a current across a resistive coating 130b allows the component to function as a resistive heating element. In some embodiments, coatings 130a and 130b are formed of an electrically conductive material.

As another example, the polymer-coated aerogel tube structure of FIGS. 2A-C have a non-porous surface (e.g., the polymer-coated surface) on which a resistive pattern can be printed to make a heater element directly on a wall of the tube.

In most instances, an electrically conductive or electrically resistive coating is applied over a polymer coating. However, in some instances, an electrically conductive or electrically resistive coating is applied directly onto an aerogel.

Uses for Polymer Coated Aerogels

Coated aerogels can have a wide variety of applications, particularly in scientific and analytical instruments. For example, polymer coated aerogels can be used as a thermal break (also referred to as a thermal barrier), which is a component having low thermal conductivity than most materials, and which is situated to reduce, often ideally prevent, the flow of thermal energy between one or more thermally conductive materials. Where a thermal break is desired, a high temperature difference between two components is often desirable. Polymer coated aerogels can also be used as thermal insulation against the environment. In general, polymer coated aerogels can be used to provide thermal insulation at any place where desired within scientific and analytical instruments.

Coated aerogels can function as one or more of an insulator, a supporting structure, an electrode, an electronic component, a heater, a cooler, a flow tube, a container, or a combination thereof.

Ion Mobility Spectrometer

Figure 9:
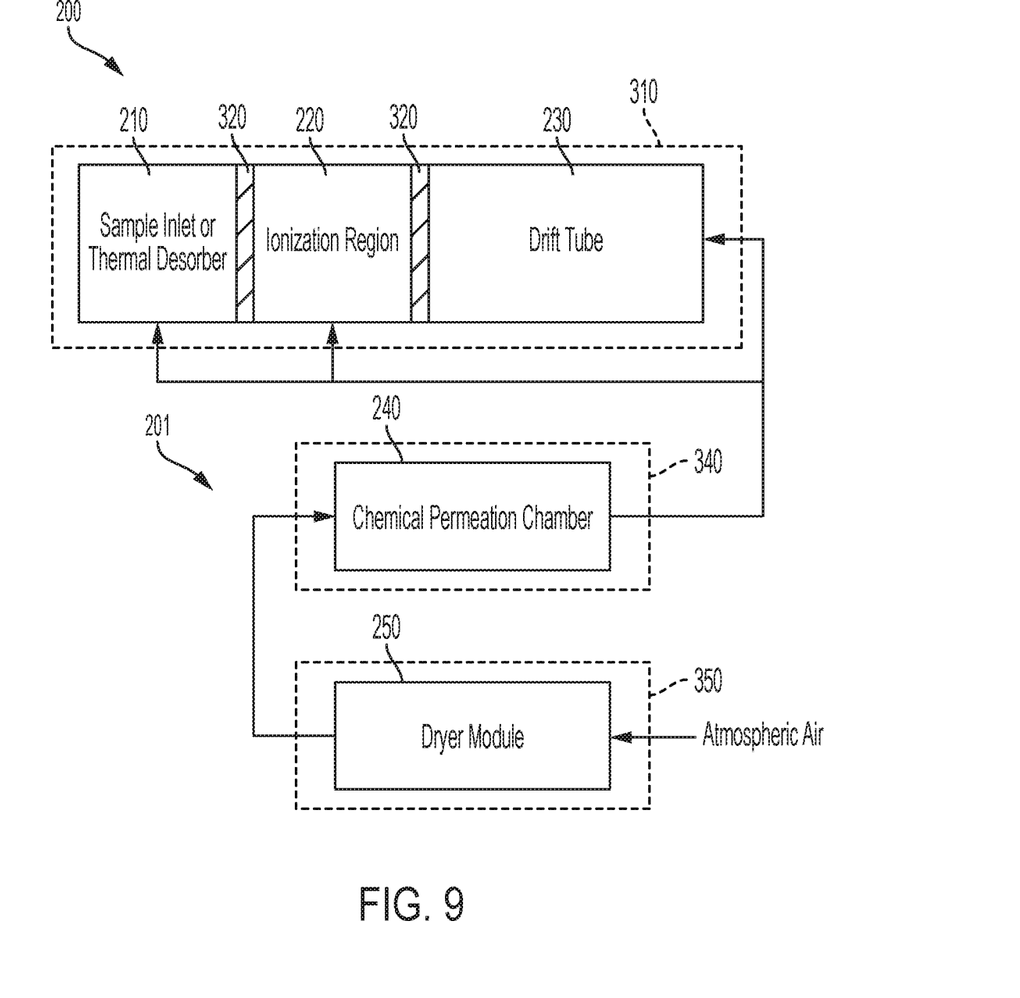
FIG. 9 is a schematic of an ion mobility spectrometer and supporting subsystems.

FIG. 9 is a schematic showing an ion mobility spectrometer and supporting subsystems. Ion mobility spectrometer 200 includes a sample inlet or thermal desorber 210, an ionization region 220, and a drift tube 230, all of which can be at least partially, or in some instances completely, surrounded by an aerogel 310. In some embodiments, an aerogel 320 can be positioned between sample inlet or thermal desorber 210 and ionization region 220. By insulating between the sample inlet or thermal desorber 210 and ionization region 220, the aerogel provides a thermal break between adjacent components having different temperatures. In some embodiments, an aerogel 320 can be positioned between ionization region 220 and drift tube 230. By insulating between the ionization region 220 and drift tube 230, the aerogel provides a thermal break between adjacent components having different temperatures. Aerogel 320 can be uncoated or polymer-coated.

Aerogel can at least partially surround one or more of supporting subsystems 201, including aerogel 240 surrounding chemical permeation chamber 240 and aerogel 350 surrounding dryer module 250. Providing aerogels at these locations provides efficient thermal insulation.

In some instances, the supporting subsystems 201 can be internal to the ion mobility spectrometer 200. In these embodiments, an aerogel can surround the entirety of the ion mobility spectrometer 200 and supporting subsystems 201.

EXEMPLIFICATION

Example 1: Coated Polyimide Aerogel Cube

Figure 5A:
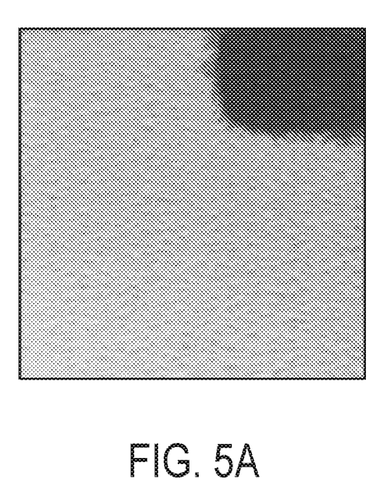
FIG. 5A is a top view of a coated aerogel surface.
Figure 5B:
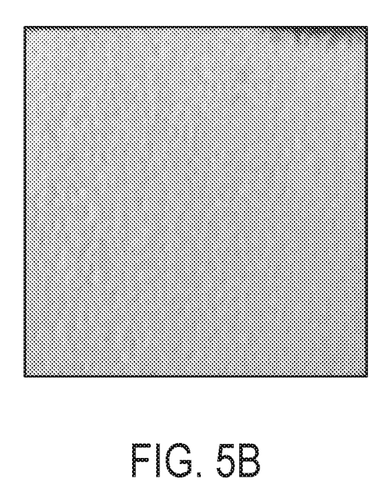
FIG. 5B is a side view (cross-sectional) of a coated aerogel.

FIGS. 5A-B are photographs showing, at a corner of a 1"×1"×1" polyimide aerogel cube, a section coated with a polymer resin by brush coating method. The aerogel cube is from Blueshift Materials Inc. (Spencer, Massachusetts, USA). The polymer resin is EPO-TEK 353ND (Epoxy Technology, Inc., Billerica, Massachusetts, USA). FIG. 5A is a photograph of a top view showing the coated surface. FIG. 5B is a photograph of a side view of the polymer-coated aerogel. As shown in FIG. 5B, the resin soaked minimally into the interior of the aerogel structure (approximately 0.5 mm to 1 mm). In both FIGS. 5A and 5B, the polymer resin has cured for two hours at 150° C.

Example 2: Coated Aerogel Disc

Figure 6:
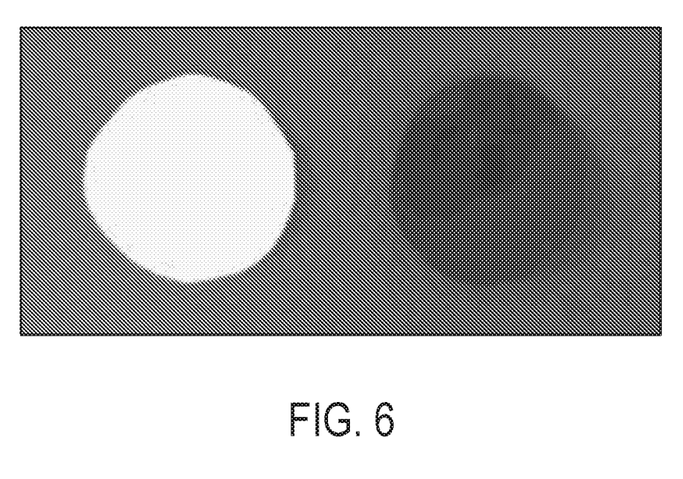
FIG. 6 is a photograph of an aerogel thin disc that is uncoated (left) and coated (right).

A polymer aerogel thin disc was brush coated with polymer. The aerogel thin disc is from Blueshift Materials Inc. (Spencer, Massachusetts, USA). The polymer resin is EPO-TEK 353ND (Epoxy Technology, Inc., Billerica, Massachusetts, USA). FIG. 6 is a photograph showing an uncoated aerogel thin disc (left) and a coated aerogel thin disc (right).

Example 3: Air Flow Tube with Coated Aerogel Disc

Figure 7A:
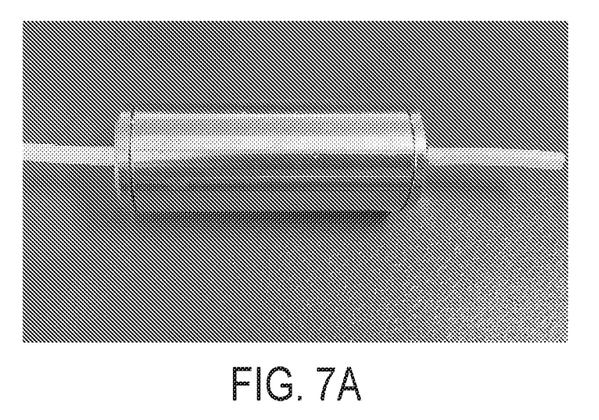
Figure 7B:
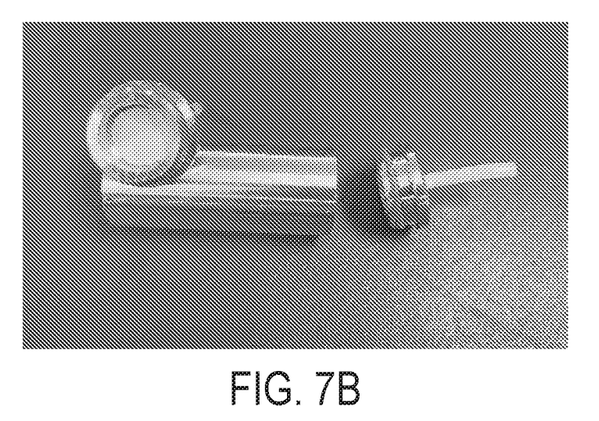
FIG. 7B is a flow tube with an non-coated aerogel disc at one of the end caps.
Figure 7C:
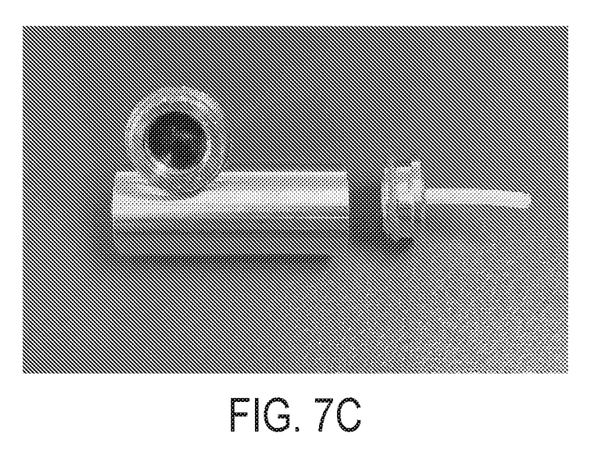
FIG. 7C is a flow tube with a polymer-coated aerogel disc at one of the end caps.
Figure 8:
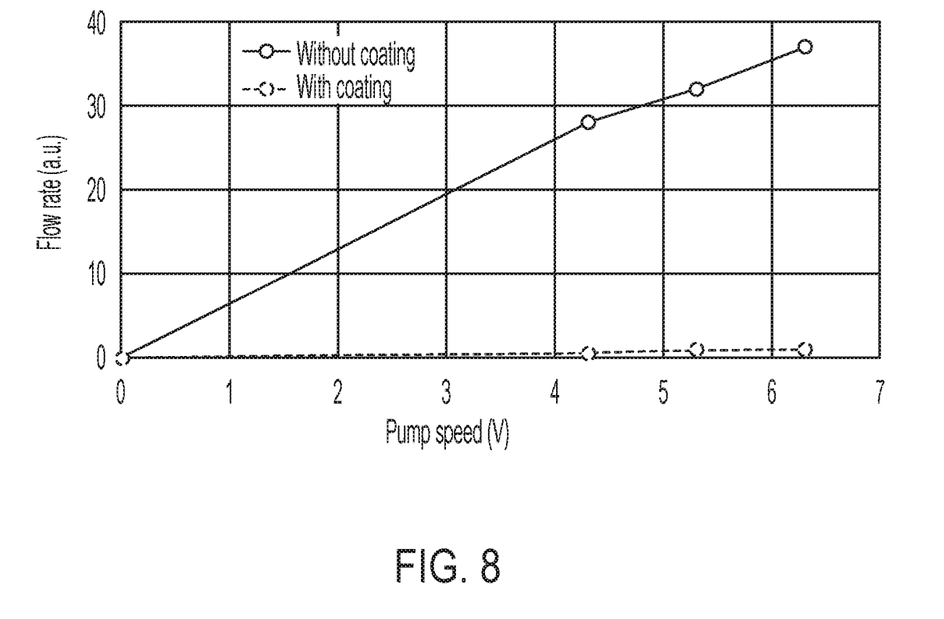
FIG. 8 is a graph of pump speed vs. flow rate for non-coated aerogel end cap and polymer-coated aerogel end cap.

An aluminum flow tube (FIG. 7A) with two end caps for flow in and flow out was used to demonstrate the effectiveness of using coated aerogel to reduce the fluidic flow across the aerogel. Flow of air was provided by a pump into one end of the tube and out the other end of the tube. Shown in FIG. 7B is a set up with an uncoated aerogel disc at one of the end caps, and shown in FIG. 7C is a set up with coated aerogel disc at one of the end caps. When the end cap was blocked with the uncoated disc, air was still flowing through, while when the end cap was blocked with the coated disc, the air flow was substantially reduced. FIG. 8 is a graph showing the flow rate through the flow tube of FIG. 7B (without coating) and FIG. 7C (with coating). As indicated in FIG. 8, when one of the end caps is blocked with a coated disc, the flow rate measured at the end of the flow tube is much lower. Thus, a coated aerogel reduces fluid flow across an aerogel structure.

EQUIVALENTS; INCORPORATION BY REFERENCE

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An ion mobility spectrometer operative on a sample, the spectrometer comprising:
    a) an inlet for the sample, an ionization region, and a drift tube, and
    b) an aerogel at least partially between the inlet and the ionization region, the aerogel providing a thermal break between the inlet and the ionization region.

2. An ion mobility spectrometer operative on a sample, the spectrometer comprising:
    a) an inlet for the sample, an ionization region, and a drift tube;
    b) an aerogel at least partially between the inlet and the ionization region; and
    c) an aerogel at least partially between the ionization region and the drift tube.

3. An ion mobility spectrometer operative on a sample, the spectrometer comprising:
    a) an inlet for the sample, an ionization region, and a drift tube;
    b) an aerogel at least partially between the inlet and the ionization region; and
    c) an aerogel at least partially surrounding the inlet, the ionization region, and the drift tube.

4. The ion mobility spectrometer of claim 1, further comprising a chemical permeation chamber that is at least partially surrounded by an aerogel.

5. The ion mobility spectrometer of claim 4, further comprising a dryer module.

6. The ion mobility spectrometer of claim 5, wherein the dryer module is at least partially surrounded by an aerogel.

7. The ion mobility spectrometer of claim 1, wherein the inlet is connected to a thermal desorber.

8. The ion mobility spectrometer of claim 7, further comprising a chemical permeation chamber that is at least partially surrounded by an aerogel.

9. The ion mobility spectrometer of claim 8, further comprising a dryer module.

10. The ion mobility spectrometer of claim 9, wherein the dryer module is at least partially surrounded by an aerogel.

11. The ion mobility spectrometer of claim 2, wherein the inlet is connected to a thermal desorber.

12. The ion mobility spectrometer of claim 3, wherein the inlet is connected to a thermal desorber.

* * * * *